(12) United States Patent
Ferstenberg

(10) Patent No.: US 6,388,906 B1
(45) Date of Patent: May 14, 2002

(54) BACKSLOPE REGULATOR SYSTEM

(75) Inventor: Isaac Ferstenberg, Edgewater, NJ (US)

(73) Assignee: Bogen Communications, Inc., Ramsey, NJ (US)

( * ) Notice: Subject to any disclaimer, the term of this patent is extended or adjusted under 35 U.S.C. 154(b) by 0 days.

(21) Appl. No.: 09/838,918

(22) Filed: Apr. 20, 2001

(51) Int. Cl.[7] .............................................. H02M 7/217
(52) U.S. Cl. ........................................ 363/86; 363/128
(58) Field of Search .............................. 363/84, 85, 86, 363/125, 128

(56) References Cited

U.S. PATENT DOCUMENTS

| | | | | |
|---|---|---|---|---|
| 4,042,873 | A | * 8/1977 | Cox | 363/128 |
| 5,572,415 | A | * 11/1996 | Mohan | 363/85 |
| 6,020,724 | A | 2/2000 | O'Loughlin | 320/166 |
| 6,038,155 | A | * 3/2000 | Pelly | 363/125 |
| 6,055,167 | A | * 4/2000 | Shamkovich et al. | 363/85 |
| 6,072,708 | A | 6/2000 | Fischer | 363/84 |
| 6,269,012 | B1 | * 7/2001 | Kusakabe et al. | 363/84 |

* cited by examiner

*Primary Examiner*—Jeffrey Sterrett
(74) *Attorney, Agent, or Firm*—Collard & Roe. P.C.

(57) ABSTRACT

A regulator system includes a circuit regulating the output of a power supply such as a capacitive input filter power supply and preferably also a transformer and full-wave diode bridge. Included are a ramp generator, a zero crossing detector synchronizing the linear ramp cycle of the ramp generator with the input AC waveform, a peak voltage detector storing the maximum voltage reached by the ramp generator, a resistive divider to reduce the peak detector voltage to a scaled voltage value corresponding to a position in time in the AC waveform below the peak voltage, a timing window comparator comparing the scaled voltage with the instantaneous ramp voltage to establish a time window signal, a conduction angle ramp generator to synchronize the start of the maximum conduction ramp voltage with the beginning of the time window and the occurrence of the minimum conduction ramp voltage with the next zero crossing of the input AC waveform, an error amplifier comparing the average output voltage of the power supply to a reference voltage to generate an error voltage, and an output comparator comparing the error voltage to the conduction ramp voltage to activate power opto-triacs connected in series with the bridge at selected times during the input AC waveform based on the comparison.

14 Claims, 2 Drawing Sheets

BACKSLOPE REGULATOR SYSTEM

BACKGROUND OF THE INVENTION

1. Field of the Invention

The present invention relates generally to circuitry for regulating power supplies. In particular, the present invention relates to a regulator system with a circuit to regulate the output of a power supply at low cost and high efficiency with a simple and compact design.

2. The Prior Art

A common problem with audio amplifiers that have conventional capacitor and choke input linear power supplies is electrical as well as thermal overstress on amplifier circuitry when there is excessively high voltage present on the alternating-current (AC) line or when the amplifier is producing low power output. The high AC line voltage can place undue stress on the amplifier and power supply components and can push them beyond their recommended safe operating conditions. To provide adequate safety margins, the amplifier and power supply circuitry have to be overbuilt to tolerate these conditions, which leads to higher component costs. Other system configurations such as high voltage 70V and 100V distributed audio systems require that maximum audio signal voltages be limited to avoid problems with their respective speaker loads.

Conventional approaches to voltage regulation include linear and switching regulators. For example, U.S. Pat. No. 6,072,708 discloses a phase controlled switching regulator power supply and U.S. Pat. No. 6,020,724 discloses a regulated capacitor charging circuit using a high-reactance transformer. These approaches have problems with complexity, efficiency, cost and the generation of electrical interference.

SUMMARY OF THE INVENTION

The present invention provides a regulator system including a simple circuit with a low component count and a low cost of implementation. The system includes an electrical system comprising a power supply, preferably a capacitive input power supply, for inputting an input alternating-current waveform having a peak voltage, preferably on the secondary winding of a transformer coupled to the power supply, and a phase modulator synchronous rectifier circuit, such as a full-wave diode bridge and a plurality of opto isolated power triacs connected in series with the bridge, coupled to the power supply.

The regulator system includes a ramp generator, preferably comprising a storage capacitor and a current source, which is coupled to the electrical system and which generates a linear ramp cycle between a minimum and a maximum voltage. A zero crossing detector connected to the ramp generator detects zero crossings of the input alternating-current waveform and synchronizes the linear ramp cycle of the ramp generator with the input alternating-current waveform.

A peak voltage detector connected to the ramp generator stores the maximum voltage reached by the generator. A resistive divider connected to the peak voltage detector reduces the peak detector voltage to a scaled voltage value corresponding to a position in time on the input alternating-current waveform below the peak voltage.

A timing window comparator connected to the ramp generator and the resistive divider compares the scaled voltage value with the instantaneous value of the ramp voltage to establish a time window signal.

The regulator system also includes a conduction angle ramp generator connected to the timing window comparator. The conduction angle ramp generator, which preferably comprises a voltage controlled current source and a timing comparator, generates a conduction ramp cycle between a maximum and a minimum conduction ramp voltage. The conduction ramp cycle is synchronized with the time window signal and the zero crossing detector so that the maximum conduction ramp voltage starts at the beginning of the time window signal and the minimum conduction ramp voltage occurs at the next zero crossing of the input alternating-current waveform.

An error amplifier connected to the power supply averages the output voltage on the power supply to an average output voltage and compares the average output voltage to a reference voltage to generate an error voltage.

An output comparator is connected to the conduction angle ramp generator and the error amplifier. The output comparator compares the error voltage to the value of the conduction ramp voltage to generate an output comparator output. The output comparator output is connected to the rectifier circuit to activate the rectifier circuit at selected times during the input alternating-current waveform.

In another aspect, the present invention provides a method of regulating the output of a power supply. An electrical system is provided including a power supply such as a capacitive input filter power supply, for inputting an alternating-current waveform having a peak voltage, preferably on the secondary winding of a transformer coupled to the power supply, and a phase modulated synchronous rectifier circuit, such as a full-wave diode bridge and a plurality of opto isolated power triacs connected in series with the bridge, coupled to the power supply.

The input alternating-current waveform is synchronized with a linear ramp cycle extending between a minimum and a maximum ramp voltage. A time window signal is established corresponding to a position in time on the input alternating-current waveform below the peak voltage band on the linear ramp cycle.

The time window signal is synchronized with the linear ramp cycle and a conduction ramp cycle extending between a maximum and a minimum conduction ramp voltage such that the maximum conduction ramp voltage starts at the beginning of the time window signal and the minimum conduction ramp voltage occurs at the next zero crossing of the input alternating-current waveform.

The value of the conduction ramp voltage is compared to an error voltage generated by a comparison between the average output voltage on the power supply and a reference voltage. The rectifier circuit, preferably the opto isolated power triacs of the circuit, is activated at selected times during the input alternating current based on this comparison.

The present invention is an improvement over prior power supply regulation approaches and may be applied for use in an audio amplifier to increase its reliability under high line conditions and, if desired, limit the amplifier's maximum output voltage swing. The present invention can also be used to regulate devices other than audio amplifiers and devices that employ capacitive input filtering. Because of its low component count, the regulator system is physically compact and requires little in the way of printed circuit board (PCB) space and mechanical packaging. Only the output triacs need to be mounted on heat sinks to ensure circuit reliability.

The regulator system also does not generate any appreciable electrical noise, as it contains no high frequency switching elements. The efficiency of this approach is enhanced by the absence of dissipative elements in the design to waste power. The control circuit makes a decision about the conduction timing of the rectifier circuit based upon the load on the power supply and replenishes the charge on the main filter capacitors that was lost on the last one half AC line cycle. The regulator system is also self-adjusting for changes in line frequency and is applicable to all world line frequency standards. It also reduces the AC inrush current of the power supply as it gradually ramps up the charge on the main filter capacitors over several AC input line cycles.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF PREFERRED EMBODIMENTS

Figure 1:
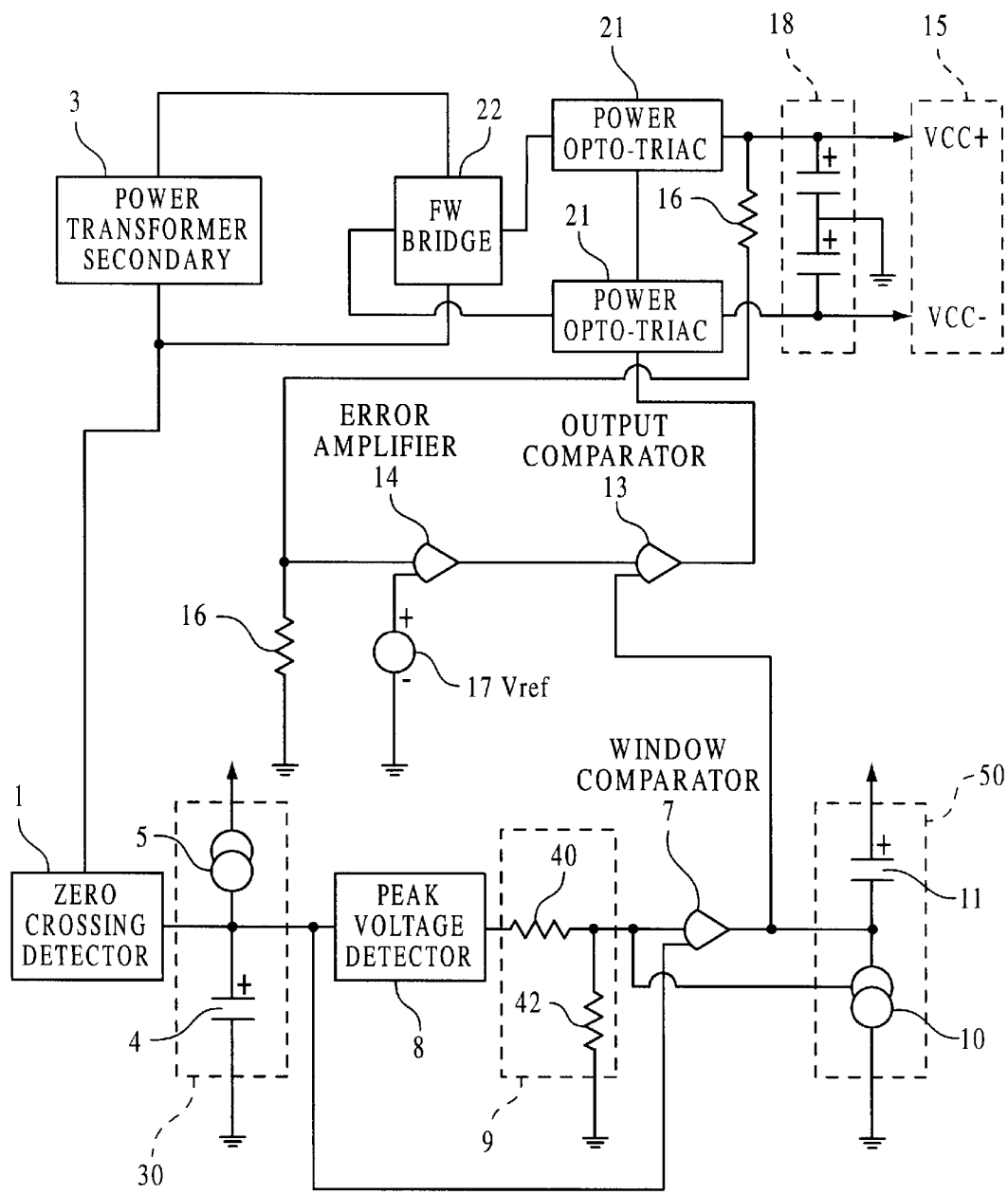
FIG. 1 shows an overall block diagram of an embodiment of the present invention.

Referring now in detail to the drawings and, in particular, FIG. 1 shows a block diagram of a regulator system according to the invention using a phase modulated synchronous rectifier and control circuitry to regulate the output of a conventional transformer 3, full-wave diode bridge 22, and capacitor input filter power supply 15 including main power supply storage capacitors 18. Other power supplies such as a choke input linear power supply may be used and other rectifier circuits may be used as well as will be readily apparent to those skilled in the art. As will also be apparent, the regulator system according to the invention may be used to regulate a variety of devices, such as audio amplifiers, devices that employ capacitive input filter and other devices.

Figure 2:
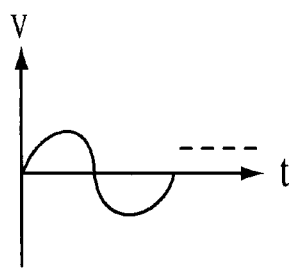
FIGS. 2–7 show waveforms plotting voltage versus time depicting the operation of certain components of the embodiment of FIG. 1.

The regulator system includes several different circuit subsystems. The first subsystem is a zero crossing detector 1. Zero crossing detector 1 includes conventional circuitry (not shown) configured to detect the zero. crossings of.-.the input AC waveform shown in FIG. 2 and to generate an output signal in accordance with the zero crossings at a frequency equal to twice that of the input line frequency. Zero crossing detector 1 synchronizes the action of the control circuitry with the input AC waveform shown in FIG. 2 present on the secondary winding of power transformer 3 and creates a time-base for the control circuitry.

Figure 3:
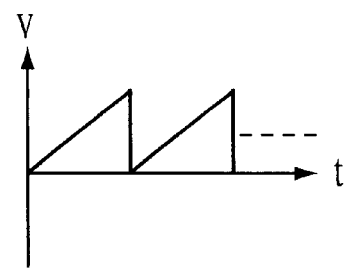

As shown in FIG. 1, zero crossing detector 1 controls the timing of a ramp generator 30. Ramp generator 30 preferably uses a storage capacitor 4 and a current source 5 to create a linear ramp that is an almost ideal sawtooth waveform as shown in FIG. 3. Other conventional ramp generators may be used to generate a linear ramp cycle between a minimum and a maximum ramp voltage. The sawtooth waveform ramp starts at its minimum ramp voltage when there is zero voltage on the output of power transformer secondary winding 3 and reaches its maximum or highest ramp voltage when the input AC waveform shown in FIG. 2 crosses zero voltage at the end of the current one half AC line cycle. The voltage is then rapidly reset as shown in FIG. 3 and the linear ramp cycle begins again, synchronizing the ramp with the timing of the AC on the power transformer secondary winding 3. The output of ramp generator 30 then provides a signal to two other circuits, a timing window comparator 7 and a peak voltage detector 8.

Peak voltage detector 8 stores the maximum voltage that ramp generator 30 has reached as shown in FIG. 3. Peak voltage detector 8 also infers the position, in time, that AC power transformer secondary winding 3 has reached its waveform peak. It is assumed that AC power transformer secondary winding 3 has an essentially symmetrical waveform about its peak. A resistive divider 9 including resistors 40, 42 is then used to scale down the voltage detected by peak detector 8. This scaled voltage essentially represents the position in time just before the AC power transformer secondary winding 3 has reached its peak voltage. This scaled down voltage from resistive divider 9 is then compared with the instantaneous value of the ramp voltage on window comparator 7. This comparison establishes the maximum timing window that the synchronous rectification system is allowed to conduct for. The time window signal is synchronized to the line frequency and becomes the range of the next timing interval, controlling the starting point and duration of the sawtooth waveform shown in FIG. 4 of a conduction angle ramp generator 50.

As shown in FIG. 1, conduction angle ramp generator 50 preferably includes a voltage controlled current source 10 and a timing capacitor. The conduction angle ramp generator waveform shown in FIG. 4 starts at the beginning of the time window signal determined by window comparator 7 at the previous step and ends at the next zero crossing of the voltage of the AC power transform secondary winding 3.

Figure 4:
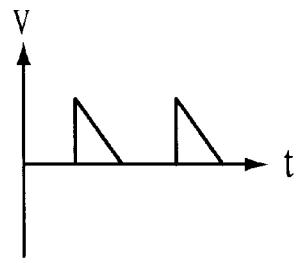

The current through its attendant current source 10 controls the slope of the sawtooth waveform of the conduction ramp cycle shown in FIG. 4 generated by conduction angle ramp generator 50. The set current of current source 10 is in turn controlled by the magnitude of the stored voltage on peak detector 8, i.e. the maximum ramp voltage reached during the linear ramp cycle. This feature ensures that the voltages through the circuit remain fairly constant even with small line frequency variations and prevents the regulation levels from changing with small changes in the frequency of the AC input waveform shown in FIG. 2 to the circuit. This method eliminates errors caused by possible changes in the AC waveform frequency and allows the circuit to work consistently for different standard input line frequencies.

The output of the conduction angle ramp circuit 50 represented by the waveform shown in FIG. 4 is the reference for an output comparator 13. The other input of output comparator 13 is tied to an error amplifier 14.

Figure 5:
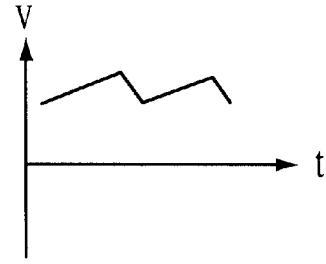

Error amplifier 14 measures the regulated output voltage of power supply 15 on the main power storage capacitors 18 through a voltage divider 16. Error amplifier 14 has a long time constant to average the output voltage present on main power supply capacitors 18. This long time constant prevents the circuit from trying to regulate the ripple, represented by the waveform shown in FIG. 5, present on the output of power supply 15 that is also present on main power supply storage capacitors 18 and provides for smoother regulation. This average voltage is then compared to a fixed reference voltage 17,and generates an error voltage represented by the waveform shown in FIG. 6.

Figure 6:
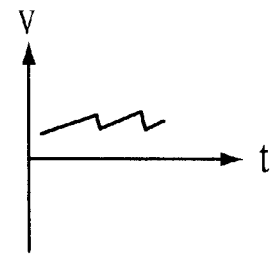
Figure 7:
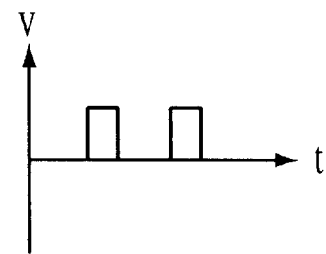

If the output voltage on the main storage capacitors 18 during the time period between successive one half line cycles is higher than the voltage on the main storage capacitors 18 on the last one half line cycle, then the output of the error amplifier shown in FIG. 6 will be lower in voltage. If the output voltage of power supply 15 is greater than the last one half line cycle, then the opposite action occurs and the output of error amplifier 14 shown in FIG. 6 will be higher in voltage. The output of error amplifier 14 is then compared to the value of the conduction angle ramp shown in FIG. 4 on output comparator 13. The output of output comparator 13 is coupled to main opto isolated power triacs or power opto-triacs 21. Main power opto-triacs 21 are placed in series with power supply bridge 22 on the positive and negative legs of power supply 15 and conduct in response to the action of output comparator 13, effectively regulating the output voltage of power supply 15 that appears on main storage capacitors 18 for the current AC one half line cycle. See FIG. 2. As shown in FIG. 7, if the voltage on power supply 15 is greater than the desired regulation point or value, i.e. the conduction ramp voltage is greater than the error voltage, output comparator 13 fires closer to the end of the current one half line cycle of the input AC line waveform of FIG. 2. In other words, output comparator 13 activates or triggers main power opto-triacs 21 later in the one half line cycle. The opposite action happens if the voltage on power supply 15 and output capacitors 18 is lower than the voltage regulation point or value (conduction ramp voltage less than error voltage), and output comparator 13 activates or fires main power opto-triacs 21 earlier in the one half line cycle.

The regulator system in accordance with the invention may be fabricated at low cost because of its low complexity and use of generic parts and inexpensive components. The system is compact and takes up little room on a printed circuit board. By precisely regulating the conduction angle of the bridge rectifiers in a capacitor input filter power supply by employing synchronous control and low loss power triacs, the system provides high voltage regulation, regulating kilowatt levels of power, as well as high efficiency with very low loss and heat dissipation. The system has automatic line synchronization that automatically adjusts to the incoming line frequency using a synchronous detection system and is compatible with and able to adapt to all international line standard frequencies. The system generates low noise in terms of electromagnetic or radio frequency interference and uses a low loss method to suppress inrush current on a capacitor input power supply by gradually changing the conduction angle of the bridge rectifier on a half-cycle basis, resulting in a soft start up.

The regulator system efficiently provides near loss less regulation through the control of the main bridge rectifier using synchronous phase control and high power triacs. The system regulates kilowatt levels with very low levels of radio frequency interference and electrical noise due to the elimination of all high frequency switching components. The system regulates kilowatt levels of power yet requires very little printed circuit board space and heat sinking due to its inherent simplicity and efficiency.

Accordingly, while a few embodiments of the present invention have been shown and described, it is obvious that many changes and modifications may be made thereunto without departing from the spirit and scope of the invention as defined in the appended claims.

What is claimed is:

1. A regulator system comprising:
  (a) an electrical system comprising a power supply for inputting an input alternating-current waveform having a peak voltage to be regulated and a phase modulated synchronous rectifier circuit coupled to the power supply for rectifying the current therefrom;
  (b) a ramp generator coupled to the electrical system for generating a linear ramp cycle between a minimum and a maximum ramp voltage;
  (c) a zero crossing detector coupled to the ramp generator for detecting zero crossings of the input alternating-current waveform and synchronizing the linear ramp cycle of the ramp generator with the input alternating-current waveform;
  (d) a peak voltage detector connected to the ramp generator, said peak voltage detector storing the maximum voltage reached by the ramp generator;
  (e) a resistive divider connected to the peak voltage detector for reducing the peak detector voltage to a scaled voltage value corresponding to a position in time on the input alternating-current waveform below the peak voltage;
  (f) a timing window comparator connected to the ramp generator and the resistive divider, said timing window comparator comparing the scaled voltage value with the instantaneous value of the ramp voltage to establish a time window signal;
  (g) a conduction angle ramp generator for generating a conduction ramp cycle between a maximum and a minimum conduction ramp voltage, said conduction ramp cycle being synchronized with the time window signal and the zero crossing detector so that the maximum conduction ramp voltage starts at the beginning of the time window signal and the minimum conduction ramp voltage occurs at the next zero crossing of the input alternating-current waveform;
  (h) an error amplifier connected to the power supply, said error amplifier averaging the output voltage on the power supply to an average output voltage and comparing the average output voltage to a reference voltage to generate an error voltage; and
  (i) an output comparator connected to the conduction angle ramp generator and the error amplifier, said output comparator comparing the error voltage to the value of the conduction ramp voltage to generate an output comparator output, said output comparator output being connected to the rectifier circuit to activate the rectifier circuit at selected times during the input alternating-current waveform.

2. The regulator system of claim 1 wherein the conduction ramp generator comprises a voltage controlled current source and a timing capacitor.

3. The regulator system of claim 2 wherein the conduction ramp cycle is a sawtooth waveform having a slope controlled by a current set by the voltage controlled current source, the current set by the voltage controlled current source being controlled by the voltage stored by the peak detector.

4. The regulator system of claim 1 wherein:
  (a) the electrical system further comprises a transformer having a secondary winding coupled to the power supply;
  (b) the power supply is a capacitive input filter power supply inputting the input alternating-current waveform on the secondary winding of the transformer;
  (c) the phase modulated synchronous rectifier circuit comprises a full-wave diode bridge and a plurality of opto isolated power triacs connected in series with the bridge; and (d) the output comparator output is connected to the power triacs to activate the power triacs at selected times during the input alternating-current waveform.

5. The regulator system of claim 4 wherein the linear ramp cycle is a sawtooth waveform having a minimum ramp voltage when there is zero voltage on the secondary winding and a maximum ramp voltage when the input alternating-current waveform crosses zero voltage at the end of a current one half alternating-current line cycle.

6. The regulator system of claim 4 wherein if the output comparator output is greater than a selected regulation value, the power triacs are activated later in a one half line cycle of the input alternating-current waveform and if the output comparator output is less than a selected regulation value, the power triacs are activated earlier in the one half line cycle of the input alternating-current waveform.

7. The regulator system of claim 4 wherein the error amplifier has a long time constant to average the output voltage on the capacitive input filter power supply.

8. The regulator system of claim 1 wherein the ramp generator comprises a storage capacitor and a current source.

9. A method of regulating the output of a power supply comprising the steps of:
(a) providing an electrical system comprising a power supply for inputting an input alternating-current waveform having a peak voltage to be regulated and a phase modulated synchronous rectifier circuit coupled to the power supply for rectifying the current therefrom;
(b) synchronizing the input alternating-current waveform with a linear ramp cycle between a minimum and a maximum ramp voltage;
(c) establishing a time window signal corresponding to a position in time on the input alternating-current waveform below the peak voltage based on the linear ramp cycle;
(d) synchronizing the time window signal with the linear ramp cycle and a conduction ramp cycle between a maximum and a minimum conduction ramp voltage such that the maximum conduction ramp voltage starts at the beginning of the time window signal and the minimum conduction ramp voltage occurs at the next zero crossing of the input alternating-current waveform;
(e) comparing the value of the conduction ramp voltage to an error voltage generated by a comparison between the average output voltage on the power supply and a reference voltage;
(f) activating the rectifier circuit at selected times during the input alternating-current waveform based on the comparison between the conduction ramp voltage and the error voltage.

10. The method of claim 9 wherein:
(a) the electrical system further comprises a transformer having a secondary winding coupled to the power supply;
(b) the power supply is a capacitive input filter power supply inputting the input alternating-current waveform on the secondary winding of the transformer;
(c) the phase modulated synchronous rectifier circuit comprises a full-wave diode bridge and a plurality of opto isolated power triacs connected in series with the bridge; and
(d) the output comparator output is connected to the power triacs to activate the power triacs at selected times during the input alternating-current waveform.

11. The method of claim 10 wherein if the conduction ramp voltage is greater than the error voltage, the power triacs are activated later in a one half line cycle of the input alternating-current waveform and if the conduction ramp voltage is less than the error voltage, the power triacs are activated earlier in the one half line cycle of the input alternating-current waveform.

12. The method of claim 10 wherein the linear ramp cycle is a sawtooth waveform having a minimum ramp voltage when there is zero voltage on the secondary winding and a maximum ramp voltage when the input alternating-current waveform crosses zero voltage at the end of a current one half alternating-current line cycle.

13. The method of claim 10 wherein the average output voltage on the capacitive input filter power supply is determined by an error amplifier having a long time constant.

14. The method of claim 9 wherein the conduction ramp cycle is a sawtooth waveform having a slope controlled by a current set by a voltage controlled current source, the current set by the voltage controlled current source being controlled by the maximum ramp voltage reached during the linear ramp cycle.

* * * * *